June 12, 1962   P. B. ANDERSEN   3,038,476
SERIES TYPE THRESHING MECHANISM
Filed June 4, 1959
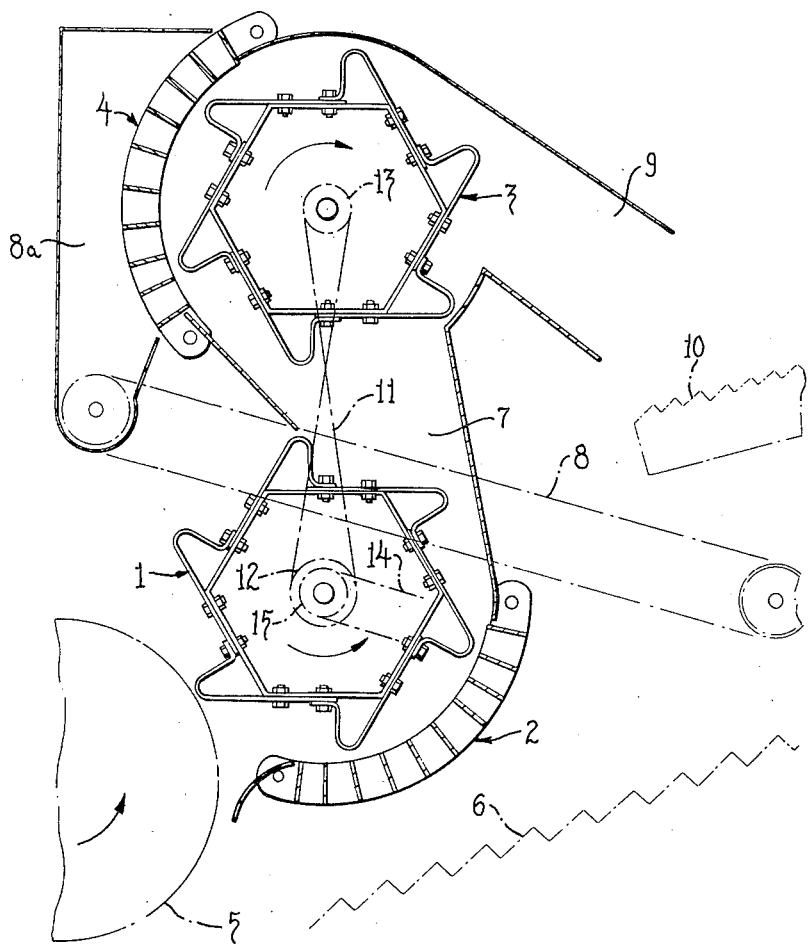
*Inventor*
PETER BONDE ANDERSEN
By
*Wolfe, Hubbard, Voit & Osann Attorneys*

United States Patent Office 3,038,476
Patented June 12, 1962

3,038,476
SERIES TYPE THRESHING MECHANISM
Peter B. Andersen, Ayr, Scotland, assignor to Massey-Ferguson (United Kingdom) Limited, Manchester, Lancashire, England, a British company
Filed June 4, 1959, Ser. No. 818,038
Claims priority, application Great Britain June 6, 1958
1 Claim. (Cl. 130—27)

The invention relates generally to combine harvesters and more particularly to improved threshing mechanism for use in such harvesters.

One object of the invention is to provide improved threshing mechanism capable of handling substantially larger quantities of cut crop material for a given power consumption.

Another object is to provide a threshing mechanism capable of separating a substantially greater percentage of the grain passing through than conventional threshing mechanisms.

Still another object is to provide a threshing mechanism that eliminates the need for beaters to assist in feeding the cut crop material to and discharging the straw from the mechanism.

Other objects and advantages of the invention will become apparent from the following detailed description of the preferred embodiment illustrated in the accompanying drawing.

Referring to the drawing, a threshing mechanism constructed in accordance with the invention comprises a cylinder 1 and associated concave 2 forming a first threshing unit and a cylinder 3 and associated concave 4 forming a second threshing unit. The latter is located above the first unit with the cylinder axis lying in the same vertical plane and the concaves 2 and 4 disposed at opposite sides of said plane as shown. The concaves 2 and 4 may be of conventional construction. The cylinders 1 and 3 may also be of any preferred construction.

In operation, cut crop material is fed into the first threshing unit by feeding mechanism which may be of any suitable character and located as indicated at 5. As the material enters the first unit, the grain is knocked by the cylinder 1 through the concave 2 onto a grain collector 6. Straw and any grain remaining is passed by the cylinder 1 up through the passage 7 to the second threshing unit. The grain separated there drops into a grain collector 8a from which an auger 8 at its lower end carries the separated grain to mix with the grain on the collector 6 for delivery to the usual cleaning mechanism. The straw from the second unit is discharged through a chute 9 to the usual straw walkers 10.

The clearance between the cylinder 1 and its concave 2 is somewhat greater than the clearance between the cylinder 3 and its concave 4 and the cylinder 3 is driven faster than the cylinder 1. For example, the clearance in the first unit may be one inch from one end of the concave to the cylinder and in the second unit the clearance at the lower end of the concave 4 may be five-eighths inch, reducing adjustably to one-half inch. The cylinders 1 and 3 preferably rotate in opposite directions and the cylinder 3 may be driven from about 10% to 20% faster than the cylinder 1. Simply by way of illustration, the cylinder 3 is shown as being driven from the cylinder 1 by the cross belt 11 running over pulleys 12 and 13 fixed to the shafts of the respective cylinders. Pulley 12 is larger than pulley 13 to provide the predetermined speed ratio between the two cylinders. The cylinder 1 may be driven in any preferred manner as by a belt 14 running over a pulley 15 on the drum shaft.

Threshing mechanism constructed in accordance with the invention has been found to have a higher throughput that is capable of handling a greater quantity of cut crop material for a given horsepower drive. Moreover, the total percentage of grain separated is considerably greater than with conventional mechanisms. No beaters are required to assist in feeding the cut crop material to and discharging the straw from the mechanism.

It is to be noted that the path between the intake of the first threshing unit and the discharge of the second unit is substantially S-shaped so that the cut crop is struck on one side by the cylinder 1 and is then struck on the other side by the cylinder 3. Substantially complete removal of all grain from the straw is thus insured.

I claim as my invention:

Threshing mechanism comprising, in combination, a first threshing unit including a concave and a cooperating rotatably supported threshing cylinder, a second threshing unit including a concave and a cooperating rotatably supported threshing cylinder, means supporting said units with one located directly above the other, drive means for rotating said cylinders with the upper cylinder rotating at least 10% faster than the lower cylinder, means for feeding cut crop material through said two units in succession, a grain collector positioned adjacent each concave to receive grain passing therethrough, and a conveyor for carrying the grain from one collector and depositing it on the other collector.

References Cited in the file of this patent
FOREIGN PATENTS

| | | |
|---|---|---|
| 805,575 | France | Aug. 31, 1936 |
| 219,065 | Switzerland | May 16, 1942 |
| 934,229 | France | Jan. 10, 1948 |